United States Patent
Sarkar et al.

(10) Patent No.: US 10,907,000 B2
(45) Date of Patent: Feb. 2, 2021

(54) FUNCTIONALLY VERSATILE AMPHIPHILIC COPOLYMERS

(71) Applicant: ISP INVESTMENTS LLC, Wilmington, DE (US)

(72) Inventors: Sounak Sarkar, Hillsborough, NJ (US); Karyn B. Visscher, Morris Plains, NJ (US); Surya Kamin, Skillman, NJ (US)

(73) Assignee: ISP INVESTMENTS LLC, Wilmington, DE (US)

( * ) Notice: Subject to any disclaimer, the term of this patent is extended or adjusted under 35 U.S.C. 154(b) by 0 days.

(21) Appl. No.: 15/575,577

(22) PCT Filed: May 20, 2016

(86) PCT No.: PCT/US2016/033421
§ 371 (c)(1),
(2) Date: Nov. 20, 2017

(87) PCT Pub. No.: WO2016/187498
PCT Pub. Date: Nov. 24, 2016

(65) Prior Publication Data
US 2018/0127551 A1 May 10, 2018

Related U.S. Application Data

(60) Provisional application No. 62/164,950, filed on May 21, 2015.

(51) Int. Cl.
| | |
|---|---|
| C08F 226/10 | (2006.01) |
| C08F 220/18 | (2006.01) |
| C08F 220/28 | (2006.01) |
| A01N 25/30 | (2006.01) |

(52) U.S. Cl.
CPC .......... C08F 226/10 (2013.01); C08F 220/18 (2013.01); C08F 220/28 (2013.01); *A01N 25/30* (2013.01); *C08F 220/1812* (2020.02); *C08F 220/286* (2020.02)

(58) Field of Classification Search
CPC ..... A01N 25/30; C08F 226/10; C08F 220/18; C08F 220/26; C08F 220/28; C08F 2220/1883; C08F 2220/285; C08F 2220/286
See application file for complete search history.

(56) References Cited

U.S. PATENT DOCUMENTS

| | | | | |
|---|---|---|---|---|
| 2004/0052746 A1* | 3/2004 | Tamareselvy | ....... | C08F 290/062 424/70.11 |
| 2006/0216335 A1* | 9/2006 | Kohara | ........ | A61K 9/7061 424/448 |
| 2008/0269105 A1 | 10/2008 | Taft et al. | | |
| 2010/0048655 A1* | 2/2010 | Koltzenburg | ......... | A01N 25/10 514/383 |
| 2010/0069557 A1* | 3/2010 | Moad | ....... | C08L 23/10 524/451 |
| 2017/0058237 A1* | 3/2017 | Iso | ....... | G02B 1/043 |
| 2017/0369614 A1* | 12/2017 | Li | ........ | A61K 8/042 |

FOREIGN PATENT DOCUMENTS

| | | | | |
|---|---|---|---|---|
| JP | 09188725 A | * | 7/1997 | ............ C08F 220/12 |
| JP | 2003252934 A | * | 9/2003 | |
| JP | 2005213448 A | * | 8/2005 | |
| WO | WO-2004113436 A1 | * | 12/2004 | ............ B82Y 30/00 |
| WO | WO2014139904 A1 | | 9/2014 | |
| WO | WO-2016047605 A1 | * | 3/2016 | ............ A01N 25/00 |

OTHER PUBLICATIONS

Machine translated English language equivalent of JP 2003252934 (2003, 12 pages).*
Machine translated English language equivalent of JP 09188725 (1997, 5 pages).*
Google patents translation of WO 2016047605 (2016, 29 pages).*
English abstract of JP 2003252934 (2003, 2 pages).*
English translation of JP 2005213448 (2005, 14 pages).*
International Search Report, PCT/US2016/033421 published on Nov. 24, 2016.

* cited by examiner

*Primary Examiner* — Brieann R Johnston
(74) *Attorney, Agent, or Firm* — William J. Davis; Nathalie Tietcheu

(57) ABSTRACT

The present invention provides multifunctional amphiphilic copolymers having the structure set out below:

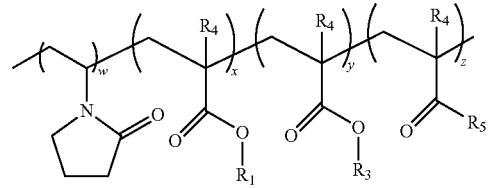

wherein w, x, y, and z are molar percentages, the sum of which equals 100%; wherein $R_1$ has the formula $-(CH_2CH_2O)_n-R_2$, where $R_2$ is hydrogen or a $C_1$-$C_{10}$ alkyl group; $R_3$ has the formula $-(CH_2)_a-CH_3$; $R_4$ is hydrogen or methyl; $R_5$ has the formula $-(OCH_2CH_2)_b-O-(CH_2)_c-CH_3$ or $-(OCH_2CH_2)_b-O-C_6H_5$; and n is an integer ranging from 1 to about 10, a is an integer ranging from 1 to about 21, b is an integer ranging from 1 to about 23, and c is an integer ranging from 1 to about 21.

The present invention also provides compositions comprising the multifunctional amphiphilic copolymers including spray drift control compositions including agricultural compositions, consumer compositions, industrial compositions, and mining compositions. The present invention also provides methods for preparing and using the multifunctional amphiphilic copolymers.

8 Claims, No Drawings

FUNCTIONALLY VERSATILE AMPHIPHILIC COPOLYMERS

FIELD OF THE INVENTION

The present invention provides multifunctional amphiphilic copolymers having improved formulation stability properties, active delivery properties, compatibility properties, crystal growth modification properties and surface activity properties for consumer, industrial, agricultural, and mining applications. The multifunctional amphiphilic copolymers are non-ionic random copolymers that are readily compatible with a wide range of hydrophilic or lipophilic/hydrophobic formulations or components with minimal or no pre-application processing. The present invention also provides compositions comprising the multifunctional amphiphilic copolymers including spray drift control and spray deposition enhancing compositions for agricultural or general spray applications, cosmetic formulations, other consumer compositions, industrial compositions, and mining compositions. The present invention also provides methods for preparing and using the multifunctional amphiphilic copolymers.

BACKGROUND OF THE INVENTION

Application of agricultural actives, primarily herbicides, pesticides, insecticides, fertilizers and water conditioners are essential to ensure crop health, growth and yield. Depending on the solubility properties of the active materials they contain, agricultural products can broadly be classifies in several major types of formulations including but not limited to Soluble Liquids (SL), Emulsion Concentrates (EC), Microemulsion concentrates (MEC), Suspension Concentrates (SC), Wettable Powders (WP), Water Dispersible Granules (WDG), Oil Dispersions (OD) and Suspo-emulsions (SE). Baring a few exceptions of application of solid powder, the most convenient and prevalent mode of application of agricultural actives include dilution of one or more of above type formulations in water in a spray tank. This spray tank mix is then sprayed from ground based (tractors, backpacks, etc.) or aerial (low flying planes or helicopters) spraying rigs through agricultural nozzles specially designed for the mode of application or the target plant, crop or field conditions. To ensure high efficacy of spray applications of agricultural material some of the priority benefits desired from tank mix adjuvants include reduction of material wastage and risk to surrounding ecosystems and human habitats from off target spray drift of fine spray droplets while promoting good spray coverage of crops by imposing superior drop-size control, good compatibility with tank mix components to ensure uniform tank-mix composition for duration of spray application, good deposition and retention of sprayed materials on target crop, spreading, sticking and crystal growth inhibition of actives on leaves and promoting good penetration of actives across leaf cuticles for enhanced uptake and delivery.

Consumer products, including but not limited to personal care, Household Industrial and Institutional (HI&I), pharmaceutical, food, beverages and Industrial products for coatings, paints and adhesives are generally multi-component systems that commonly include both hydrophilic and hydrophobic materials in the same formulation. Complex physicochemical interactions among the many different components that make up such formulations often pose great challenges in compatibilizing these components in to a single stable formulation and targeted active delivery across biological surfaces like hair, skin, cuticles and teeth etc., which very often are made up of alternating hydrophilic and lipophilic layers.

Thus in a broad sense a gamut of applications including but not limited to agriculture, consumer products, personal care formulations, industrial and mining applications and coatings and paints compositions can benefit from specially designed amphiphilic polymeric materials that are readily compatible with a wide range of hydrophilic or lipophilic/hydrophobic formulations or components with minimal or no pre-application processing.

Amphiphilic polymers can be broadly classified into (a) non-ionic block copolymers and (b) ionic random or block copolymers. Synthesis of block copolymers generally involves metal-mediated catalytic methods or multiple synthetic sequences, which makes inclusion of multiple desired functionalities a complex and often expensive process. The prospect of having residual catalytic metal species in the final polymeric products often makes them unfit for use in consumer product formulations which have strict restrictions on trace metal concentrations. Polymers that impart amphiphilicity by virtue of possessing one or more ionic functionalities (cationic or anionic) generally require pre-application processing (neutralization or acidification) to activate the ionic functionalities. Intolerance to other ionic species in the formulation, condition-dependent (pH, ionic strength, etc.) solubility, and stability constants further restrict the scope of applications of ionic amphiphilic polymers in multi-component, multi-phasic and high ionic-strength formulations over the full Hydrophilic and Lipophilic Balance (HLB) range.

U.S. Pat. No. 9,006,142 discloses agrochemical formulations comprising vinyl pyrrolidone polymers. EP 0772467 discloses methoxy poly(ethylene glycol) monomethacrylate, n-vinyl pyrrolidone and 2-ethyl-hexyl acrylate catheter balloon coatings. U.S. Pat. No. 8,404,783 discloses amphiphilic polymers in contact lens. WO 2014/138327 discloses detersive compositions and U.S. Pat. No. 7,109,155 discloses industrial cleaning compositions.

Accordingly, it would be desirable to provide novel non-ionic amphiphilic random copolymers, compositions, and methods of using the amphiphilic copolymers to address formulations, active deliveries, compatibilities and surface activity requirements for consumer, personal care, industrial, agricultural, and mining applications.

SUMMARY OF THE INVENTION

The present invention provides multifunctional amphiphilic copolymers having the structure set out below:

wherein w, x, y, and z are molar percentages, the sum of which equals 100%; wherein $R_1$ has the formula —$(CH_2CH_2O)_n$—$R_2$, where $R_2$ is Hydrogen or a $C_1$-$C_{10}$ alkyl group; $R_3$ has the formula —$(CH_2)_a$—$CH_3$; $R_4$ is Hydrogen or methyl; $R_5$ has the formula —$(OCH_2CH_2)_b$—O—$(CH_2)_c$—$CH_3$ or —$(OCH_2CH_2)_b$—O—$C_6H_5$; and n is an integer ranging from 1 to about 10, a is an integer ranging from 1 to about 21, b is an integer ranging from 1 to about 23, and c is an integer ranging from 1 to about 21.

The present invention also provides compositions comprising the multifunctional amphiphilic copolymers including spray drift control compositions such as agricultural compositions, consumer compositions, industrial compositions, and mining compositions. The present invention also provides methods for preparing and using the multifunctional amphiphilic copolymers.

The present invention also provides enhanced application performances in various fields of end-user applications including, but not limited to, pharmaceuticals, food and beverages, coatings, paints, energy sector agents, performance materials, oral care, skin care, hair care, cosmetics, toiletry, household and cleaning products, industrial and institutional cleaning products, disinfecting products, opthalmics, injectables, sanitary products, agricultural products, textiles, biocides, preservatives, consumer products, and laundry products. Compositions comprising the multifunctional amphiphilic copolymers are especially useful in adhesive compositions, aerosol compositions, agricultural compositions, beverage compositions, cleaning compositions, coating compositions, cosmetic compositions, dental compositions, detergent compositions, drug compositions, encapsulation compositions, food compositions, hair spray compositions, lithographic compositions, membrane compositions, oilfield compositions, personal care compositions, pharmaceutical compositions, pigment compositions, and spray drift mitigation compositions.

DETAILED DESCRIPTION OF THE INVENTION

The present invention provides multifunctional amphiphilic copolymers having improved formulations stability properties, active delivery properties, compatibility properties, crystal growth modification properties and surface activity properties for consumer, industrial, agricultural, and mining applications. The multifunctional amphiphilic copolymers are non-ionic random copolymers that are readily compatible with a wide range of hydrophilic or lipophilic/hydrophobic formulations or components with minimal or no pre-application processing. The present invention also provides compositions comprising the multifunctional amphiphilic copolymers including spray drift control and spray deposition enhancing compositions for agricultural or general spray applications, consumer compositions, industrial compositions, and mining compositions. The present invention also provides methods for preparing and using the multifunctional amphiphilic copolymers.

The polylactamic components of the non-ionic amphiphilic copolymers of the present invention were included in the polymer architecture because of multipurpose benefits they provide including but not limited to good film formation upon deposition, provide controlled hydrophilicity to copolymer structure, association with active ingredients or formulation components with hydrophilic surface properties in solution, emulsion or as particulates for better formulation stability, compatibility and active retention and delivery during application. The hydrophobic backbone chain and hydrophilic pendant lactamic functionalities of the polylactamic segments in the copolymers of present invention provide other benefits including but not limited to tunable Hydrophilic Lipophilic Balance (HLB), humectancy, crystal growth modification, solubility and surface activity.

The polyalkoxy alkyl components of the non-ionic amphiphilic copolymers of the present invention were included in the polymer architecture because of multipurpose benefits they provide including but not limited to providing controlled hydrophilicity and/or hydrophobicity to copolymer structure, penetration of biological surfaces or coatings having complex or alternate hydrophilic and lipophilic layer structures, compatibility and formulation stability in hydrophilic, lipophilic or mixed environments. The hydrophobic backbone chain and hydrophilic pendant polyalkoxy alkyl functionalities of these segments in the copolymers of present invention provide other benefits including but not limited to tunable Hydrophilic Lipophilic Balance (HLB), humectancy, crystal growth modification, solubility, and surface activity.

The polyalkyl components of the non-ionic amphiphilic copolymers of the present invention were included in the polymer architecture because of multipurpose benefits they provide including but not limited to providing controlled hydrophobicity to copolymer structure, association with hydrophobic or hydrophobically modified actives and formulation components, enhanced spreading and sticking and active retention on hydrophobic surfaces, penetration of biological surfaces or coatings having complex or alternate hydrophilic and lipophilic layer structures, compatibility and formulation stability in hydrophilic, lipophilic or mixed environments. The hydrophobic backbone chain and hydrophobic pendant polyalkyl functionalities of these segments in the copolymers of present invention provide other benefits including but not limited to tunable Hydrophilic Lipophilic Balance (HLB), crystal growth modification, solubility and surface activity.

All percentages, parts, proportions, and ratios as used herein are by weight of the total composition, unless otherwise specified. All such weights as they pertain to listed ingredients are based on the active level and therefore do not include solvents or by-products that may be included in commercially available materials, unless otherwise specified.

All references to singular characteristics or limitations of the present invention shall include the corresponding plural characteristics or limitations, and vice-versa, unless otherwise specified or clearly implied to the contrary by the context in which the reference is made.

Numerical ranges as used herein are intended to include every number and subset of numbers contained within that range, whether specifically disclosed or not. Further, these numerical ranges should be construed as providing support for a claim directed to any number or subset of numbers in that range.

All publications, articles, papers, patents, patent publications, and other references cited herein are hereby incorporated herein in their entireties for all purposes to the extent consistent with the disclosure herein.

As used herein, the following terms, unless otherwise stated, have the meanings set out below.

The term "a" or "an" when used in conjunction with the term "comprising" may mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or."

The term "about" refers to a difference of 10% from the value specified. Numerical ranges as used herein are meant to include every number and subset of numbers enclosed within that range, whether particularly disclosed or not. All percentages, parts, proportions, and ratios, as used herein, are by weight of the total composition, unless otherwise specified.

The term "acidic conditions" refers to conditions relating to the pH value of an aqueous solution. Pure water is considered to be neutral, with a pH close to 7.0 at 25° C. Solutions with a pH value less than 7 are considered to be acidic solutions.

The term "alkyl" refers to a functionalized or unfunctionalized monovalent straight-chain, branched-chain or cyclic $C_1$-$C_{60}$ group optionally having one or more heteroatoms. Particularly, an alkyl is a $C_1$-$C_{45}$ group and more particularly, a $C_1$-$C_{30}$ group. Particular, yet non-limiting examples of alkyl groups include methyl, ethyl, n-propyl, isopropyl, n-butyl, isobutyl, tert-butyl, cyclobutyl, n-pentyl, isopentyl, cyclopentyl, n-hexyl, cyclohexyl, n-heptyl, cyclyheptyl, methylcyclohexyl, n-octyl, 2-ethylhexyl, tert-octyl, iso-nor-bornyl, n-dodecyl, tert-dodecyl, n-tetradecyl, n-hexadecyl, n-octadecyl, and n-eicosyl and catenated chains of any of the above.

The term "alkyl (alk) acrylate" refers to an alkyl ester of an acrylic acid or an alkyl acrylic acid.

The term "alkyl (alk) acrylamide" refers to an alkyl amide of an acrylic acid or an alkyl acrylic acid.

The term "alkylene" refers to a functionalized or unfunctionalized divalent straight-chain, branched-chain or cyclic $C_1$-$C_{40}$ group optionally having one or more heteroatoms. Particularly, an alkylene is a $C_1$-$C_{45}$ group and more particularly, a $C_1$-$C_{30}$ group. Particular, yet non-limiting examples of alkylene groups include —$CH_2$—. —$CH_2$—$CH_2$—, —$CH(CH_3)$—$CH_2$—, —$CH_2$—$CH(CH_3)$—, —$C(CH_3)_2$—$CH_2$—, —$CH_2$—$C(CH_3)_2$—, —$CH(CH_3)$—$CH(CH_3)$—, —$C(CH_3)_2$—$C(CH_3)_2$—, —$CH_2$—$CH_2$—$CH_2$—, —$CH(CH_3)$—$CH_2$—$CH_2$—, —$CH_2$—$CH(CH_3)$—$CH_2$—, —$CH_2$—$CH_2$—$CH(CH_3)$—, —$CH_2$—$CH_2$—$CH_2$—$CH_2$—, —$CH_2$—$CH_2$—$CH_2$—$CH_2$—$CH_2$—, —$CH_2$—$CH_2$—$CH_2$—$CH_2$—$CH_2$—$CH_2$—, —$CH_2$—$CH_2$—$CH_2$—$CH_2$—$CH_2$—$CH_2$—$CH_2$—, cyclopropylene, cyclobutylene, cyclopentylene, cyclohexylene, and the like.

The term "amphiphilic" refers to chemical compounds possessing both hydrophilic (water-loving, polar) and hydrophobic (water repelling, fat-loving, lipophilic, non-polar) properties. Examples of charged hydrophilic groups include anionic groups (negatively charged) such as carboxylates, sulfates, sulfonates, and phosphates and cationic groups (positively charged) such as ammoniums. Examples of uncharged hydrophilic groups include alcohols with large alkyl groups such as diacyl glycerol and oligoethylene glycols. Amphiphilic compounds may have several hydrophilic and hydrophobic parts within the compound.

The term "aryl" refers to a functional group derived from an aromatic hydrocarbon. The aromatic hydrocarbon can be mononuclear or polynuclear. Examples of aryl group of the mononuclear type include phenyl, tolyl, xylyl, mesityl, cumenyl, and the like. Examples of aryl group of the polynuclear type include naphthyl, anthryl, phenanthryl, and the like. The aryl group can have at least one substituent selected from halogen, hydroxy, cyano, carboxy, carbamoyl, nitro, amino, aminomethyl, lower alkyl, lower alkoxy, mercapto, trichloroethyl, or trifluoromethyl. Examples of such substituted aryl groups include 2-fluorophenyl, 3-nitrophenyl, 4-nitrophenyl, 4-methoxyphenyl, 4-hydroxyphenyl, and the like.

The term "branched and unbranched alkyl groups" refers to alkyl groups, which may be straight chained or branched. For example, the alkyl groups have from 1 to about 60 carbon atoms, more particularly, from 1 to about 30 carbon atoms, and yet more particularly from 1 to about 6 carbon atoms. Branched groups include isopropyl, tert-butyl, and the like.

The term "comprising" refers to optional compatible components that can be used provided that the important ingredients are present in the suitable form and concentrations. The term "comprising" thus encompasses and includes the more restrictive terms "consisting of" and "consisting essentially of" which can be used to characterize the essential ingredients such as cellulose ethers moieties, vinylic moieties, aryl, acryl and methacryl moieties, lactam moieties, linking groups and/or hybrid polymers.

The term "cycloalkyl group" refers to a non-aromatic mono- or multicyclo ring system having from about 3 to about 10 carbon atoms. The cycloalkyl group can be partially unsaturated. The cycloalkyl group can also be substituted with an alkyl group substituent as defined herein. The cycloalkyl chain may contain an oxygen, sulfur, or substituted or unsubstituted nitrogen atom, wherein the nitrogen substituent may be hydrogen, alkyl, substituted alkyl, aryl, or substituted aryl, thus providing a heterocyclo group. Representative monocyclo cycloalkyl rings include, but are not limited to, cyclopropyl, cyclobutyl, cyclopentyl, cyclohexyl, cycloheptyl, and the like. Further, the cycloalkyl group can be substituted with a linking group, such as an alkyl group, alkylene group, and the like, to form cyclopropylmethyl group, cyclobutylmethyl group, and the like. The cycloalkyl group may also be a multicyclo cycloalkyl rings such as adamantyl, octahydronaphthyl, decalin, camphor, camphane, and noradamantyl.

The terms "effective amount" and "effective use level" of an agent refer to a sufficient amount of an agent employed to provide desired performance attributes, stability, efficacy, product aesthetics, and the like.

The term "free radical addition polymerization initiator" refers to a compound used in a catalytic amount to initiate a free radical addition polymerization, and is used herein as simply "initiator"". The term "free radical addition polymerization initiator" also refers to thermal and light activated initiators. The choice of "initiator" depends mainly upon its solubility and its decomposition temperature.

The term "functionalized" refers to the state of a moiety that has one or more functional groups introduced to it by way of one or more functionalization reactions known to a person having ordinary skill in the art. Particular, yet non-limiting examples of functionalization reactions include epoxidation, sulfonation, hydrolysis, amidation, esterification, hydroxylation, dihyroxylation, amination, ammonolysis, acylation, nitration, oxidation, dehydration, elimination, hydration, dehydrogenation, hydrogenation, acetalization, halogenation, dehydrohalogenation, Michael addition, aldol condensation, Canizzaro reaction, Mannich reaction, Clasien condensation, Suzuki coupling, and the like. Particularly, functionalization of a moiety replaces one or more hydrogens in the moiety with one or more non-hydrogen groups, for e.g., alkyl, alkoxyl, cycloalkyl, alkenyl, cycloalkenyl, alkynyl, and/or aryl groups. Particular, yet non-limiting examples of cycloalkyl groups include cyclopentane, cyclohexane, cycloheptane, and the like. Particular, yet non-limiting examples of alkoxy groups include methoxy, ethoxy, n-propoxy, isopropoxy, and the like. Particular, yet non-limiting examples of aryl groups include benzenes, naphthalenes (2 rings), anthracenes (3 rings), and the like.

The term "halogen" refers to chloro, bromo, iodo and fluoro, and in one embodiment is bromo and/or chloro.

The term "heteroatom" refers to atoms such as oxygen, nitrogen, sulfur, silicon, phosphorous, and/or halogen. The heteroatom(s) may be present as a part of one or more heteroatom-containing functional groups and/or as a part of one or more heterocyclic rings. Non-limiting examples of heteroatom-containing functional groups include ether, hydroxy, epoxy, carbonyl, carboxamide, carboxylic ester, carboxylic acid, imine, imide, amine, sulfonic, sulfonamide, phosphonic, and silane groups.

The term "homopolymer" refers to a molecule that comprises one type of monomer and the term "non-homopolymer" refers to a polymer that comprises more than one type of monomer and includes such polymers wherein a small amount of polymerization solvent may or may not be covalently bonded into the polymer. The non-homopolymer may be a copolymer, terpolymer, tetramer, or the like.

The term "hydrophilic-lipophilic balance" (HLB) refers to the degree to which a surfactant is hydrophilic or lipophilic, determined by calculating values for the different regions of the molecule.

The term "ionic" refers to compounds comprising ions held together by electrostatic forces.

The terms "linking group" and "spacer group" refer to a segment or group of molecules configured to connect two or more molecules to each another. When the linking group or spacer group is defined as being absent, the linking group or spacer group is replaced by a direct bond.

The term "monomer" refers to the repeat units that comprise a polymer. A monomer is a compound that chemically bonds to other molecules, including other monomers, to form a polymer.

The term "multifunctional" refers to compounds having multiple or many functions or activities.

The term "multifunctional amphiphilic copolymer" refers to a polymer having multiple or many functions or activities and possessing both hydrophilic hydrophobic properties.

The term "non-ionic" refers to compounds not held together by electrostatic forces. These molecules are held together with covalent bonds.

The terms "one embodiment," "one aspect", "one version", and "one objective" of the invention include one or more such embodiments, aspects, versions, or objectives, unless the context clearly dictates otherwise.

The term "personal care composition" refers to such illustrative non-limiting compositions as skin, sun, oil, hair, and preservative compositions, including those to alter the color and appearance of the skin.

The term "pH" refers to a measure of the acidity or basicity of an aqueous solution. Pure water is considered to be neutral, with a pH of about 7.0 at 25° C. Solutions with a pH less than 7 are considered to be acidic and solutions with a pH greater than 7 are considered to be basic or alkaline.

The terms "pharmaceutically acceptable" and "cosmetically acceptable" refer to molecular entities and compositions that are generally regarded as safe. Particularly, as used herein, the term "pharmaceutically acceptable" and "cosmetically acceptable" refer to approved by a regulatory agency of the appropriate governmental agency or listed in the U.S. Pharmacopoeia or other generally recognized pharmacopoeia for use in animals, and more particularly in humans.

The term "pharmaceutically acceptable excipient" refers to an additive included in a solid formulation in the form of powders, granules, capsules, pellets and tablets to increase the bulk of the desired formulation comprising present solid dispersion. The excipients may be added during or after the preparation of solid dispersion using spray drying or hot-melt extrusion or other methods.

The term "pharmaceutically active ingredient" refers to any ingredient considered to have a therapeutic effect when delivered to a subject in need thereof and further being regulated by drug authorities. Pharmaceutically active ingredients may act systemically upon oral consumption, or locally such as when present in the buccal cavity, on the skin, etc. They may also be delivered across the skin as in transdermal drug delivery systems.

The term "agricultural active ingredient" refers to any ingredient considered to have one or more of herbicide, pesticide, insecticide, fungicide, fertilizer, micronutrient, macronutrient, water conditioner activity when delivered to a subject in need thereof and further being regulated by environment protection authorities. Agricultural actives can be systemic, contact and/or translocating in activity and might be delivered to soil or on exposed crop or plant parts.

The term "polymer" refers to both linear and branched polymers derived from one or more monomer units, which may or may not be crosslinked or grafted. Non-limiting examples of polymers include copolymers, terpolymers, tetramers, and the like, wherein the polymer is random, block, or alternating polymer.

The term "poorly soluble" refers to slightly soluble or very slightly soluble compounds that require from about 100 or more parts of solvent for one part of solute. The poorly soluble compound means that the solubilization of the active pharmaceutical ingredient (API) compound becomes the rate-limiting step for absorption of such API compound.

The terms "preferred," "preferably", and variants thereof, refer to embodiments of the invention that afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The present invention provides multifunctional amphiphilic copolymers having improved formulations, active delivery properties, compatibility properties, and surface activity properties for consumer, industrial, agricultural, and mining applications. The multifunctional amphiphilic is a copolymer comprising vinyl pyrrolidone/methoxy poly(ethylene glycol) methacrylate/lauryl methacrylate. The present invention also provides compositions comprising the multifunctional amphiphilic copolymers including spray drift control compositions including agricultural compositions, consumer compositions, industrial compositions, and mining compositions. The present invention also provides methods for preparing and using the multifunctional amphiphilic copolymers.

The multifunctional amphiphilic copolymers of the present invention are non-ionic random amphiphilic copolymers having minimal or no pre-application processing in a wide range of formulations having varying degrees of hydrophilic lipophilic balance (HLB). The multifunctional amphiphilic copolymers may be combined with commercially available monomers by free-radical polymerization techniques to allow inclusion of additional beneficial properties such as surfactancy, humectancy, association with hydrophobic and hydrophilic actives, penetration, film formation, and material transport and delivery. The multifunctional amphiphilic copolymers are soluble in water and oils (mineral oils, aromatic oils, seed oils or animal lipids) and can be employed as "drop-in" additives to stabilize formulations that are not readily compatible with hydrophilic and lipophilic materials while tolerating strongly ionic formulations with high electrolyte loadings.

The properties and efficacies of the multifunctional amphiphilic copolymers are useful for many applications including, but not limited to, spray drift reduction for agricultural formulations, hair and skin care formulations, and oral care applications.

Solutions of the present multifunctional amphiphilic copolymers may be added to crop oil and crop oil blends in an agricultural spray formulation to provide stable emulsions by associating the oils and water-soluble actives in the spray. The multifunctional amphiphilic copolymers can also be used to control the dynamic and static surface tensions rendering precise control of the droplet size and drop size distributions while spraying agricultural tank-mixes through standard commercial agricultural nozzles thereby significantly reducing driftable fines even at ultra-low polymer concentrations. Additional benefits include spreading spray droplets of compositions containing the multifunctional amphiphilic copolymers on plant leaves to provide cuticle penetration and enhanced uniform transport of active materials through leaves. Solutions of these multifunctional amphiphilic copolymers find particular utility in agricultural applications, especially drift reduction, droplet deposition, and spreading and efficacy enhancement of agricultural actives.

The present invention provides multifunctional amphiphilic copolymers having the structure set out below:

wherein w, x, y, and z are molar percentages, the sum of which equals 100%; wherein $R_1$ has the formula $-(CH_2CH_2O)_n-R_2$, where $R_2$ is hydrogen or a $C_1$-$C_{10}$ alkyl group; $R_3$ has the formula $-(CH_2)_a-CH_3$; $R_4$ is hydrogen or methyl; $R_5$ has the formula $-(OCH_2CH_2)_b-O-(CH_2)_c-CH_3$ or $-(OCH_2CH_2)_b-O-C_6H_5$; and n is an integer ranging from 1 to about 10, a is an integer ranging from 1 to about 21, b is an integer ranging from 1 to about 23, and c is an integer ranging from 1 to about 21. Preferably, w ranges from about 10% to about 80%, x ranges from about 10% to about 80%, y ranges from about 10% to about 80%, and z ranges from 0% to about 50%. Preferably, n ranges from 1 to about 8, a ranges from 1 to about 15, b ranges from about 1 to about 15, and c ranges from 1 to about 15.

Preferably, the copolymer has the structure selected from the group consisting of wherein w is about 25%, x is about 25%, y is about 50%, and n is from 1 to about 10 and wherein w is about 10%, x is about 30%, y is about 30%, z is about 30%, and n is from 1 to about 10.

More preferably, the copolymer has the structure set out below:

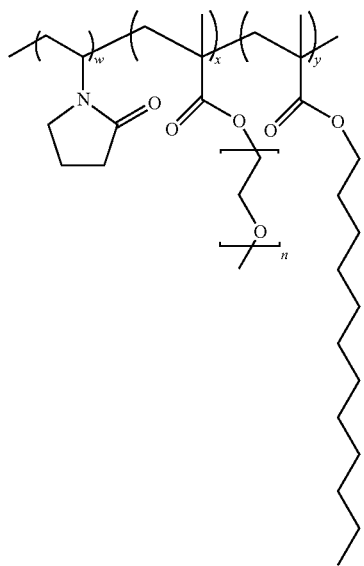

wherein w is about 25%, x is about 25%, y is about 50%, and n is from 1 to about 10.

More preferably, the copolymer has the structure set out below:

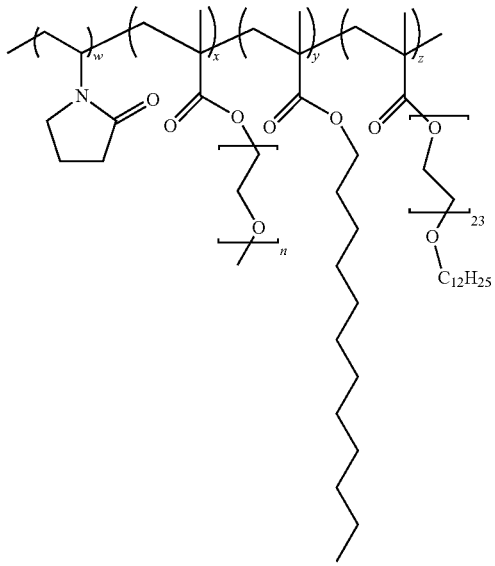

wherein w is about 10%, x is about 30%, y is about 30%, z is about 30%, and n is from 1 to about 10.

The present invention also provides compositions comprising multifunctional amphiphilic copolymers having the structure set out below:

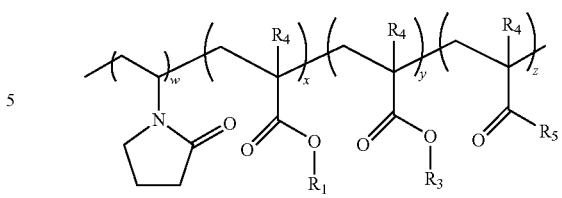

wherein w, x, y, and z are molar percentages, the sum of which equals 100%; wherein $R_1$ has the formula $-(CH_2CH_2O)_n-R_2$, where $R_2$ is hydrogen or a $C_1$-$C_{10}$ alkyl group; $R_3$ has the formula $-(CH_2)_a-CH_3$; $R_4$ is hydrogen or methyl; $R_5$ has the formula $-(OCH_2CH_2)_b-O-(CH_2)_c-CH_3$ or $-(OCH_2CH_2)_b-O-C_6H_5$; and n is an integer ranging from 1 to about 10, a is an integer ranging from 1 to about 21, b is an integer ranging from 1 to about 23 and c is an integer ranging from 1 to about 21.

Preferably, w ranges from about 10% to about 80%, x ranges from about 10% to about 80%, y ranges from about 10% to about 80%, and z ranges from 0% to about 50%. Preferably, n ranges from 1 to about 8, a ranges from 1 to about 15, b ranges from about 1 to about 15, and c ranges from 1 to about 15.

The compositions may further comprise an agent selected from the group consisting of adhesive agents, aerosol agents, agricultural agents, anti-soil redeposition agents, battery agents, beverage agents, biocide agents, block copolymer agents, branch/comb copolymer agents, cementing agents, cleaning agents, coating agents, conductive agents, cosmetic agents, cross-linker agents, dental agents, pigment agents, detergent agents, dispersant agents, drug agents, electronic agents, encapsulation agents, food agents, hair spray agents, herbicide agents, household-industrial-institutional agents, ink and coating agents, interlaminate adhesive agents, lithographic solution agents, membrane additive agents, metal working agents, oilfield agents, paint agents, paper agents, personal care agents, pharmaceutical agents, pigment agents, plaster agents, plastic agents, printing agents, reactive biocide agents, reactive rheology modifier agents, refractive index modifier agents, sequestrant agents, soil release agents, static control agents, and wood-care agents.

The compositions may be selected from the group consisting of adhesive compositions, aerosol compositions, agricultural compositions, beverage compositions, cleaning compositions, coating compositions, cosmetic compositions, dental compositions, detergent compositions, drug compositions, encapsulation compositions, food compositions, hair spray compositions, lithographic compositions, membrane compositions, oilfield compositions, personal care compositions, pharmaceutical compositions, pigment compositions, and spray drift control compositions. The spray drift control compositions may be selected from the group consisting of agricultural compositions, consumer compositions, industrial compositions, and mining compositions.

The composition may further comprise a mineral oil, aromatic oil, crop oil, seed oil, proprietary oil blend, and mixtures thereof; an effective amount of an agricultural agent; and water in a quantity sufficient to reach final volume. The composition may be an agricultural spray drift composition. The agricultural agent may be herbicide, pesticide, insecticide, fungicide, fertilizer, micronutrient, macronutrient, water conditioner and mixtures thereof. The composition wherein the copolymer has the structure selected from the group consisting of

[Structure diagram]

wherein w is about 25%, x is about 25%, y is about 50%, and n is from 1 to about 10 and

[Structure diagram]

wherein w is about 10%, x is about 30%, y is about 30%, z is about 30%, and n is from 1 to about 10.

The present invention also provides methods for improving spray application of agricultural materials by reducing risks from off target drift of spray droplets and increasing efficacy of agricultural actives used in spray applications comprising a composition comprising:

(a) a multifunctional amphiphilic copolymer having the structure:

[Structure diagram]

wherein w, x, y, and z are molar percentages, the sum of which equals 100%; wherein $R_1$ has the formula $-(CH_2CH_2O)_n-R_2$, where $R_2$ is hydrogen or a $C_1$-$C_{10}$ alkyl group; $R_3$ has the formula $-(CH_2)_a-CH_3$; $R_4$ is hydrogen or methyl; $R_5$ has the formula $-(OCH_2CH_2)_b-O-(CH_2)_c-CH_3$ or $-(OCH_2CH_2)_b-O-C_6H_5$; and n is an integer ranging from 1 to about 10, a is an integer ranging from 1 to about 21, b is an integer ranging from 1 to about 23 and c is an integer ranging from 1 to about 21;

(b) a crop oil, mineral oil, aromatic oil, seed oil, proprietary oil blend, and mixtures thereof;

(c) an effective amount of an agricultural agent; and (d) water in a quantity sufficient to reach final volume.

Preferably, w ranges from about 10% to about 80%, x ranges from about 10% to about 80%, y ranges from about 10% to about 80%, and z ranges from 0% to about 50%. Preferably, n ranges from 1 to about 8, a ranges from 1 to about 15, b ranges from about 1 to about 15, and c ranges from 1 to about 15. Preferably, the agricultural agent is an herbicide, pesticide, fungicide, and mixtures thereof.

Preferably, copolymer has the structure selected from the group consisting of:

[Structure diagram]

wherein w is about 25%, x is about 25%, y is about 50%, and n is from 1 to about 10 and

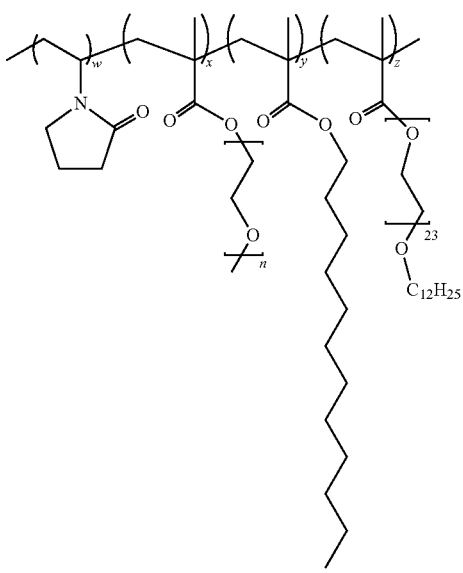

wherein w is about 10%, x is about 30%, y is about 30%, z is about 30%, and n is from 1 to about 10.

The multifunctional amphiphilic copolymers, compositions comprising the multifunctional amphiphilic copolymers, and methods for preparing and using the multifunctional amphiphilic copolymers are set in the examples below. The examples are presented for purposes of demonstrating, but not limiting, the preparation of the hybrid polymers of this invention.

EXAMPLES

Example 1

Synthesis of Amphiphilic Copolymer VP/PEG-OMeMA/LMA (25/25/50) Copolymer 1

VP/PEG-OMe-MA/LMA

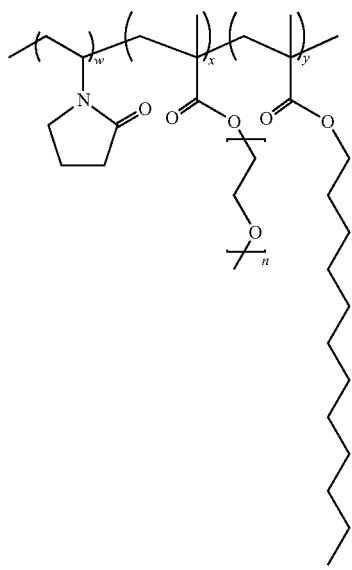

Feed one is prepared with 9.82 g vinyl pyrrolidone (VP); 44.18 g poly(ethylene glycol) methyl ether methacrylate (PEG-OMe-MA) (500 Mw), 44.96 g lauryl methacrylate (LMA) and 45.31 g methyl ethyl ketone (MEK). Put 191.26 g MEK into the reactor and commence purging of the reaction vessel with nitrogen. Heat the reaction flask containing MEK to reflux ~78° C. In a separate vessel prepare a mixture of Triganox 25C 75 (1.0 g) and Acetone (20 g). Label this vessel "Triganox Solution". When the reaction flask has reached reflux temperature, begin adding Feed 1, drop-wise, in to the reaction vessel over a period of 180 minutes. After 15 minutes of monomer feed, add 2 g of the Triganox Solution into the reactor. Continue the drop-wise addition of Feed 1 over a period of approximately 165 minutes. While the monomers are feeding into the reactor, after 30 minutes charge 2.0 g of the Triganox solution. After 45, 60, 75, 90, 105, and 120 minutes, charge 2.3 g Triganox solution into the reactor. After 150 minutes, charge 2.0 g Triganox solution into the reactor. At the completion of the monomer feeds, charge the reaction vessel with the remainder of the Triganox solution. The reaction vessel is allowed to heat at reflux for an additional 180 minutes. Note: during the initiator shots, additional MEK was added to replace any that has volatilized. Cool the reaction vessel and leave the material in the reactor. This is the end of 'day one'. On 'day two', re-heat the vessel to reflux, and charge with 2.5 g Triganox 25C 75. Hold for 2 hours. Add an additional 2.5 g Triganox 25C 75. Hold for 5 hours then cool reaction mixture.

Example 2

Synthesis of Amphiphilic Copolymer VP/PEG-OMeMA/LMA/LEM (10/30/30/30) Copolymer 2

VP/PEG-OMe-MA/LMA/LEM

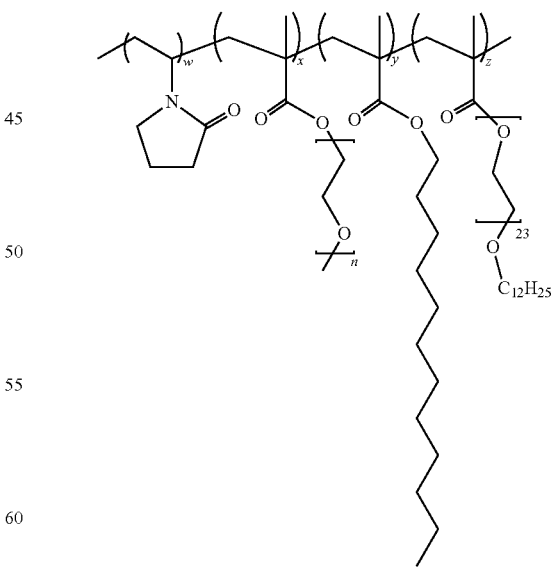

Feed one is prepared with 24.73 g (polyethylene glycol methyl ether) methacrylate (500 Mw) (PEG-OMe-MA); 12.58 g lauryl methacrylate (LMA); 67.0 g laurylethoxy [23] methacrylate (LEM); and 105.7 g methyl ethyl ketone (MEK). Put 127 g MEK and 1.83 g Vinyl Pyrrolidone (VP) into the reactor and commence purging of the reaction vessel with nitrogen. Heat the reaction flask containing MEK to reflux ~78° C. In a separate vessel prepare a mixture of Triganox 25C 75 (1.0 g) and MEK (20 g). Label this vessel "Triganox Solution". When the reaction flask has reached reflux temperature, begin adding Feed 1, drop-wise, in to the reaction vessel over a period of 180 minutes. After 15 minutes of monomer feed, add 3 g of the Triganox Solution into the reactor. Continue the drop-wise addition of Feed 1 over a period of approximately 165 minutes. While the monomers are feeding into the reactor, after 30 minutes charge 2.3 of the Triganox solution. After 45, 60, 75, 90, 105 and 120 minutes, charge equivalent amounts of the Triganox solution into the reactor. At the completion of the monomer feeds, charge the reaction vessel with the remainder of the Triganox solution. The reaction vessel is allowed to heat at reflux for an additional 180 minutes. Note: during the initiator shots, additional MEK was added to replace any that has volatilized. Cool the reaction vessel and leave the material in the reactor. This is the end of 'day one'. On 'day two', re-heat the vessel to reflux and charge with 2.5 g Triganox 25C 75. Hold for 2 hours. Add an additional 2.5 g Triganox 25C 75. Hold for 5 hours then cool reaction mixture.

Example 3

M-DCA Preparation

Multifunctional Drift Control Agents (M-DCA) were prepared by solvent exchange of amphiphilic copolymer 1 synthesis reaction mixtures into a variety of mineral oils, aromatic oils, crop oils, seed oils, derivatized crop oils, derivatized seeds oils, proprietary oil blends or mixtures thereof maintaining with polymer concentration in oil solutions 1-30%, preferably between 1-15%, more preferably between 1-10% solids.

Example 4

Preparation of Spray Tank-Mix Solutions

2 Liter spray solutions were prepared with active (herbicide) @ 1 quart/10 gallon, between 1 to 50 Oz/acre, preferably between 1 to 20 Oz/acre, more preferably between 1 to 10 Oz/acre dosage of M-DCA and rest of the volume being made up with water. A control solution was prepared by adding just the active (herbicide) @ 1 quart/10 gallon to water without any DCA. Components of the simulated spray tank-mix solutions thus prepared were thoroughly mixed before spraying through some of the most prevalently used agricultural nozzles.

Example 5

DCA Performance Evaluation with Ground-Based XR11004 (Fine) Nozzle

Spray tank-mix solutions containing herbicide only and herbicide with M-DCA described in Example 4 were sprayed through ground-based fine commercial agricultural spray nozzle XR11004 at a pressure of 43.5 PSI in a Low Speed Wind Tunnel (LSWT) with 15 mph concurrent laminar wind flow parallel to the plane of the spray with a vertically traversing nozzle head moving perpendicular to the wind direction at a speed of 2.4 inches/s. A linear distance of 12 inches was maintained between the nozzle outlet and the laser beam to ensure complete atomization of spray fluid in to droplets. Spray drop size distributions for each sprayed sample were analyzed using a Sympatec Helos Vario KR laser diffraction particle size analyzer equipped with R7 lense capable of detecting drop sizes in the range of 18 to 3500 μm. Drop-size and distribution generated by each spray sample and reduction in driftable fines (%<105 μm) by DCA sample in comparison to the control are shown in Table 1.

TABLE 1

| Simulated Air Speed (mph) | 15 | | |
|---|---|---|---|
| Nozzle | XR11004 | | |
| DCA Samples | Herbicide (Control) | M-DCA in Herbicide | M-DCA in Herbicide |
| DCA Dosage (Oz/acre) | 0.00 | 2.00 | 4.00 |
| Dv10 (μm) | 88 | 132 | 134 |
| Dv50 (μm) | 212 | 256 | 260 |
| Dv90 (μm) | 395 | 411 | 414 |
| % Vol <105 μm | 14.71 | 4.61 | 4.64 |
| % Reduction <105 μm | 0 | 68.66 | 68.46 |

Example 6

DCA Performance Evaluation with Ground-Based AIXR11004 (Medium) Nozzle

Spray tank-mix solutions containing herbicide only and herbicide with M-DCA described in Example 4 were sprayed through ground-based medium commercial agricultural spray nozzle AIXR11004 at a pressure of 43.5 PSI in a Low Speed Wind Tunnel (LSWT) with 15 mph concurrent laminar wind flow parallel to the plane of the spray with a vertically traversing nozzle head moving perpendicular to the wind direction at a speed of 2.4 inches/s. A linear distance of 12 inches was maintained between the nozzle outlet and the laser beam to ensure complete atomization of spray fluid in to droplets. Spray drop size distributions for each sprayed sample were analyzed using a Sympatec Helos Vario KR laser diffraction particle size analyzer equipped with R7 lense capable of detecting drop sizes in the range of 18 to 3500 m. Drop-size and distribution generated by each spray sample and reduction in driftable fines (%<105 m) by DCA sample in comparison to the control are shown in Table 2.

TABLE 2

| Simulated Air Speed (mph) | 15 | |
|---|---|---|
| Nozzle | AIXR 11004 | |
| DCA Samples | Herbicide (Control) | M-DCA in Herbicide |
| DCA Dosage (Oz/acre) | 0.00 | 2.00 |
| Dv10 (μm) | 177 | 231 |
| Dv50 (μm) | 392 | 431 |
| Dv90 (μm) | 640 | 628 |
| % Vol <105 μm | 2.52 | 0.35 |
| % Reduction <105 mm | 0 | 86.11 |

Example 7

DCA Performance Evaluation with Ground-Based TTI11004 (Coarse) Nozzle

Spray tank-mix solutions containing herbicide only and herbicide with M-DCA described in Example 4 were sprayed through ground-based coarse commercial agricultural spray nozzle TTI11004 at a pressure of 43.5 PSI in a Low Speed Wind Tunnel (LSWT) with 15 mph concurrent laminar wind flow parallel to the plane of the spray with a vertically traversing nozzle head moving perpendicular to the wind direction at a speed of 2.4 inches/s. A linear distance of 12 inches was maintained between the nozzle outlet and the laser beam to ensure complete atomization of spray fluid in to droplets. Spray drop size distributions for each sprayed sample were analyzed using a Sympatec Helos Vario KR laser diffraction particle size analyzer equipped with R7 lense capable of detecting drop sizes in the range of 18 to 3500 rm. Drop-size and distribution generated by each spray sample and reduction in driftable fines (%<105 μm) by DCA sample in comparison to the control are shown in Table 3.

TABLE 3

| Simulated Air Speed (mph) | 15 | |
|---|---|---|
| Nozzle | TTI 11004 | |
| DCA Samples | Herbicide (Control) | M-DCA in Herbicide |
| DCA Dosage (Oz/acre) | 0.00 | 2.00 |
| Dv10 (μm) | 348 | 310 |
| Dv50 (μm) | 729 | 603 |
| Dv90 (μm) | 1114 | 926 |
| % Vol <105 μm | 0.21 | 0.16 |
| % Reduction <105 mm | 0 | 23.81 |

Example 8

DCA Performance Evaluation with Aerial Nozzles at 80 Mph Airspeed

Spray tank-mix solutions containing herbicide only and herbicide with M-DCA described in Example 4 were sprayed through commercial aerial agricultural spray nozzles CP11T-A256-8012 and CP11T-A256-8020 at a pressure of 43.5 PSI in a High Speed Wind Tunnel (HSWT) with 80 mph concurrent laminar wind flow parallel to the plane of the spray with a vertically traversing nozzle head moving perpendicular to the wind direction at a speed of 2.4 inches/s. A linear distance of 18 inches was maintained between the nozzle outlet and the laser beam to ensure complete atomization of spray fluid in to droplets. Spray drop size distributions for each sprayed sample were analyzed using a Sympatec Helos Vario KR laser diffraction particle size analyzer equipped with R7 lense capable of detecting drop sizes in the range of 18 to 3500 rm. Drop-size and distribution generated by each spray sample and reduction in driftable fines (%<105 μm) by DCA sample in comparison to the control are shown in Table 4.

TABLE 4

| Simulated Air speed (mph) | 80 | | | |
|---|---|---|---|---|
| Nozzle | CP11T-A256-8012 | | CP11T-A256-8020 | |
| DCA Samples | Herbicide (Control) | M-DCA in Herbicide | Herbicide (Control) | M-DCA in Herbicide |
| DCA Dosage (Oz/acre) | 0 | 4 | 0 | 4 |
| Dv10 (μm) | 144 | 224 | 159 | 228 |
| Dv50 (μm) | 355 | 432 | 430 | 482 |
| Dv90 (μm) | 634 | 649 | 808 | 753 |
| % Vol <105 μm | 4.85 | 0.91 | 4.02 | 1.04 |
| % Reduction <105 mm | 0 | 81.24 | 0 | 74.13 |

Example 9

DCA Performance Evaluation with Aerial Nozzles at 145 Mph Airspeed

Spray tank-mix solutions containing herbicide only and herbicide with M-DCA described in Example 4 were sprayed through commercial aerial agricultural spray nozzles CP11T-A256-8012 and CP11T-A256-8020 at a pressure of 43.5 PSI in a High Speed Wind Tunnel (HSWT) with 145 mph concurrent laminar wind flow parallel to the plane of the spray with a vertically traversing nozzle head moving perpendicular to the wind direction at a speed of 2.4 inches/s. A linear distance of 18 inches was maintained between the nozzle outlet and the laser beam to ensure complete atomization of spray fluid in to droplets. Spray drop size distributions for each sprayed sample were analyzed using a Sympatec Helos Vario KR laser diffraction particle size analyzer equipped with R7 lense capable of detecting drop sizes in the range of 18 to 3500 rm. Drop-size and distribution generated by each spray sample and reduction in driftable fines (%<105 μm) by DCA sample in comparison to the control are shown in Table 5.

TABLE 5

| Simulated Air speed (mph) | 145 | | | |
|---|---|---|---|---|
| Nozzle | CP11T-A256-8012 | | CP11T-A256-8020 | |
| DCA Samples | Herbicide (Control) | M-DCA in Herbicide | Herbicide (Control) | M-DCA in Herbicide |
| DCA Dosage (Oz/acre) | 0 | 4 | 0 | 4 |
| Dv10 (μm) | 89 | 108 | 93 | 105 |
| Dv50 (μm) | 233 | 234 | 240 | 239 |
| Dv90 (μm) | 464 | 396 | 476 | 441 |
| % Vol <105 μm | 13.66 | 9.34 | 12.54 | 9.99 |
| % Reduction <105 mm | 0 | 31.63 | 0 | 20.33 |

The non-ionic or pseudo-ionic amphiphilic random copolymers useful herein consist of selected monomers, including but not restricted to, ethylenically unsaturated vinylic, acrylate or methacrylates of lactams, polyalkoxy alkanols, polyalkoxy alkanol ethers, polyalkoxy esters, $C_4$-$C_{18}$ straight or branched chain alkanes and alkane esters, polyoxyalkylene alkylaryl ethers, alcohol ethoxylates, polyhydroxyalkyl, polyalkoxyalkylaryls and alkylaryls.

These polymers are individually completely soluble in water and oils (mineral oils, seed oils or animal lipids), are water soluble-oil dispersible or oil soluble-water dispersible. Thus, these polymers can be used as emulsifiers, polymeric surfactants, compatibilizers, formulation aids and stabilizers.

These polymers by virtue of judicious selection on monomers additionally possess beneficial attributes like humactancy, association with hydrophobic and hydrophilic actives, penetration, film formation, and material transport and delivery.

While this invention has been described in detail with reference to certain preferred embodiments, it should be appreciated that the present invention is not limited to those precise embodiments. Rather, in view of the present disclosure, which describes the current best mode for practicing the invention, many modifications and variations would present themselves to those skilled in the art without departing from the scope and spirit of this invention.

We claim:

1. A multifunctional amphiphilic copolymer having the following structure:

[chemical structure]

wherein w is about 10%, x is about 30%, y is about 30%, z is about 30%, and n is from 2 to 8, wherein w, x, y, and z are molar percentages, the sum of which equal 100%.

2. A spray drift control composition comprising a multifunctional amphiphilic copolymer having the following structure:

[chemical structure]

wherein w is about 10%, x is about 30%, y is about 30%, z is about 30%, and n is from 2 to 8, wherein w, x, y, and z are molar percentages, the sum of which equal 100%.

3. The composition according to claim 2, wherein the spray drift control composition is selected from the group consisting of agricultural compositions, consumer compositions, industrial compositions, and mining compositions.

4. The composition according to claim 2, further comprising a crop oil, seed oil, proprietary oil blend, or mixtures thereof; an effective amount of an agricultural agent; and water in a quantity sufficient to reach final volume.

5. The composition according to claim 4, wherein the composition is an agricultural spray drift composition.

6. The composition according to claim 5, wherein the agricultural agent is an herbicide, pesticide, fungicide, or mixtures thereof.

7. A method for improving the health of plants comprising contacting a plant with a composition comprising:
(a) a multifunctional amphiphilic copolymer having the following structure:

[chemical structure]

wherein w is about 10%, x is about 30%, y is about 30%, z is about 30%, and n is from 2 to 8, wherein w, x, y, and z are molar percentages, the sum of which equal 100%;

(b) a crop oil, seed oil, proprietary oil blend, or mixtures thereof;

(c) an effective amount of an agricultural agent; and (d) water in a quantity sufficient to reach final volume.

8. The method according to claim 7, wherein the agricultural agent is an herbicide, pesticide, fungicide, or mixtures thereof.

* * * * *